(12) United States Patent
Bi

(10) Patent No.: US 10,606,320 B2
(45) Date of Patent: Mar. 31, 2020

(54) FOLDING MECHANISM FOR FLEXIBLE DISPLAY SCREEN

(71) Applicant: Wuhan China Star Optoelectronics Technology Co., Ltd., Wuhan, Hubei (CN)

(72) Inventor: Wei Bi, Hubei (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 329 days.

(21) Appl. No.: 15/519,356

(22) PCT Filed: Mar. 9, 2017

(86) PCT No.: PCT/CN2017/076082
§ 371 (c)(1),
(2) Date: Apr. 14, 2017

(87) PCT Pub. No.: WO2018/148996
PCT Pub. Date: Aug. 23, 2018

(65) Prior Publication Data
US 2019/0094916 A1    Mar. 28, 2019

(30) Foreign Application Priority Data
Feb. 17, 2017   (CN) .......................... 2017 1 0086599

(51) Int. Cl.
*H05K 5/00* (2006.01)
*G06F 1/16* (2006.01)

(52) U.S. Cl.
CPC .......... *G06F 1/1681* (2013.01); *G06F 1/1616* (2013.01); *G06F 1/1652* (2013.01)

(58) Field of Classification Search
CPC ....................................................... H05K 5/00
See application file for complete search history.

(56) References Cited

U.S. PATENT DOCUMENTS

2013/0021762 A1 * 1/2013 van Dijk ............... G06F 1/1652
361/749

FOREIGN PATENT DOCUMENTS

| CN | 101171823 A | 4/2008 |
| CN | 102262845 A | 11/2011 |

(Continued)

OTHER PUBLICATIONS

Chen, Portable bending tool for oil delivery pipe of automobile, has lower supporting plate arranged in center shaft, block groove provided with adjusting block, upper supporting plate provided with mandrel that is matched with center shaft hole, Mar. 2013, Derwent (Year: 2013).*

(Continued)

*Primary Examiner* — Jerry Wu

(57) ABSTRACT

Disclosed is a folding mechanism for a flexible display screen, including: a deformable support member, two load portions, and retaining mechanisms. A flexible display screen is secured to the deformable support and at least a portion of each of the load portions, and the load portions are provided thereon with sliders. Each of the retaining mechanisms is provided with two slide rails with predetermined tracks, and the sliders are movable within corresponding slide rails. The folding mechanism can realize functions of bending, folding and flatting the flexible display screen. In addition, the retaining mechanism has functions of a guide rail and a retaining member so that the load portion is bent inwardly along the predetermined track to realize bending and folding without wrinkling.

19 Claims, 3 Drawing Sheets

(56) References Cited

FOREIGN PATENT DOCUMENTS

| | | |
|---|---|---|
| CN | 103582340 A | 2/2014 |
| CN | 105761615 A | 7/2016 |
| JP | 2016018198 A | 2/2016 |

OTHER PUBLICATIONS

International Search Report and Written Opinion for International Application No. PCT/CN2017/076082, dated Sep. 3, 2017.
Chinese Office Action and Search Report for Chinese Patent Application No. 201710086599.9, dated Aug. 27, 2018.

\* cited by examiner

FOLDING MECHANISM FOR FLEXIBLE DISPLAY SCREEN

CROSS-REFERENCE TO RELATED APPLICATIONS

This application claims the priority of Chinese patent application CN2017100865999, entitled "Folding Mechanism for Flexible Display Screen" and filed on Feb. 17, 2017, the entirety of which is incorporated herein by reference.

FIELD OF THE INVENTION

The present disclosure relates to a folding mechanism, and in particular, to a folding mechanism for a flexible display screen.

BACKGROUND OF THE INVENTION

A flexible display screen is a display device made of a flexible material, and it is flexible. In particular, a flexible display screen uses phosphorescent OLEDs, and is characterized by low power consumption, small size, and direct visual flexibility. Flexible display screens have been attracting more and more attention due to the advantages that they are thin and light, unbreakable, flexible, and wearable.

However, it is a major problem in the art that a flexible display screen is liable to wrinkle in a bent or folded state, which seriously affects its display effect and service life.

The inventors of the present disclosure have found that a main cause of wrinkles is that the flexible display screen is not provided with a special retaining structure for controlling a bending degree of the screen. For this reason, the inventors propose a folding mechanism for a flexible display screen, which can not only achieve flexible and folding functions of an electronic display product with a flexible display screen, but also ensure that the flexible display screen does not wrinkle in a bent or folded state.

SUMMARY OF THE INVENTION

An objective of the present disclosure is to provide a folding mechanism for a flexible display screen, which can not only achieve flexible and folding functions of an electronic display product with a flexible display screen, but also ensure that the flexible display screen does not wrinkle in a bent or folded state.

In order to achieve above objective, the present disclosure provides a folding mechanism for a flexible display screen. The folding mechanism comprises:

a deformable support member;

two load portions, respectively secured to two opposite ends of the deformable support member, wherein a flexible display screen is secured to the deformable support and at least a portion of each of the load portions located at both ends of the deformable support member, and the load portions are provided with sliders on two sides of ends thereof facing each other, and two retaining mechanisms, respectively secured to the other two opposite ends of the deformable support member, wherein each of the retaining mechanisms is provided with two slide rails having predetermined tracks, and sliders of the load portions are configured to move within corresponding slide rails.

The deformable support member is made of a memory alloy.

The deformable support member is made of a titanium-nickel alloy, an amorphous metal, or an inorganic material.

The slide rail is curved and bent toward a center direction of the retaining mechanism.

Two slide rails on each of the retaining mechanisms are symmetrical.

A trajectory point of the slide rail satisfies the following conditions:

$$Dx = r^*\sin(\theta), Dy = r - r^*\cos(\theta)$$

wherein, $\theta$ is an angle between a point on the slide rail and the y-axis, and r is a radius of the arc where the point is located.

The load portions are provided with grooves at the two ends thereof facing each other for placing the deformable support member, so that when the deformable support member is placed in the grooves of the load portions. A surface of the deformable support member is flush with surfaces of the load portions towards the flexible display screen.

During a folding process, the load portion is always tangent to the deformable support member due to the predetermined track of the slide rail.

The sliders are aligned with the ends of the deformable support member.

The deformable support member is a sheet-like structure or a frame-like structure.

The present disclosure provides the following beneficial effects. It can realize bending, folding and flatting functions of the flexible display screen. In addition, the retaining mechanism has functions of a guide rail and a limiting member so that the load portion is bent inwardly along a predetermined track to realize bending and folding without wrinkling.

BRIEF DESCRIPTION OF THE DRAWINGS

The present disclosure will be described in a more detailed way below based on embodiments and with reference to the accompanying drawings, in which.

In the accompanying drawings, same components use same reference signs. The accompanying drawings are not drawn according to actual proportions.

DETAILED DESCRIPTION OF THE EMBODIMENTS

The present disclosure will be further described below with reference to the accompanying drawings.

As shown in FIGS. 1 to 4, the present disclosure provides a folding mechanism for a flexible display screen. The folding mechanism mainly includes a retaining mechanism 10, a load portion 30, and a deformable support member 40. In this context, the "upper", "lower", "left" and "right" are defined according to FIG. 2. For example, an "upper side" and a "lower side" of the deformable support member 40 are connected to the retaining mechanism 10, and a "left side" and a "right side" of the deformable support member 40 are connected to the load portion 30, respectively.

Figure 3:
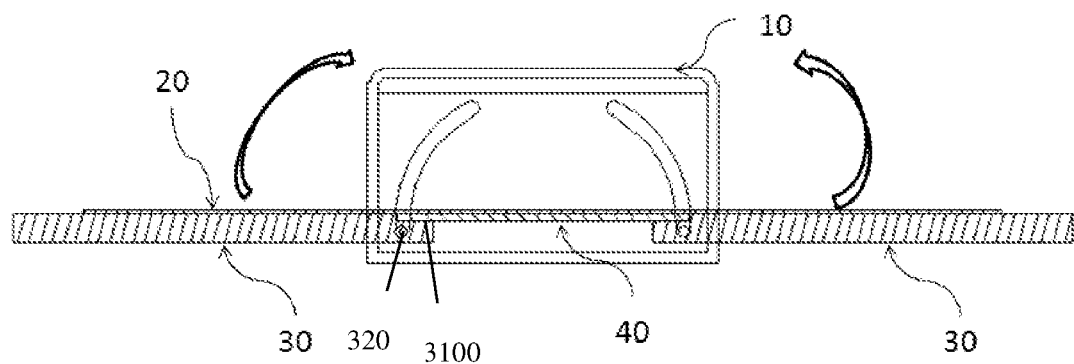
FIG. 3 is a cross-sectional view of the folding mechanism for a flexible display screen in the flattened state according to the present disclosure.
Figure 4:
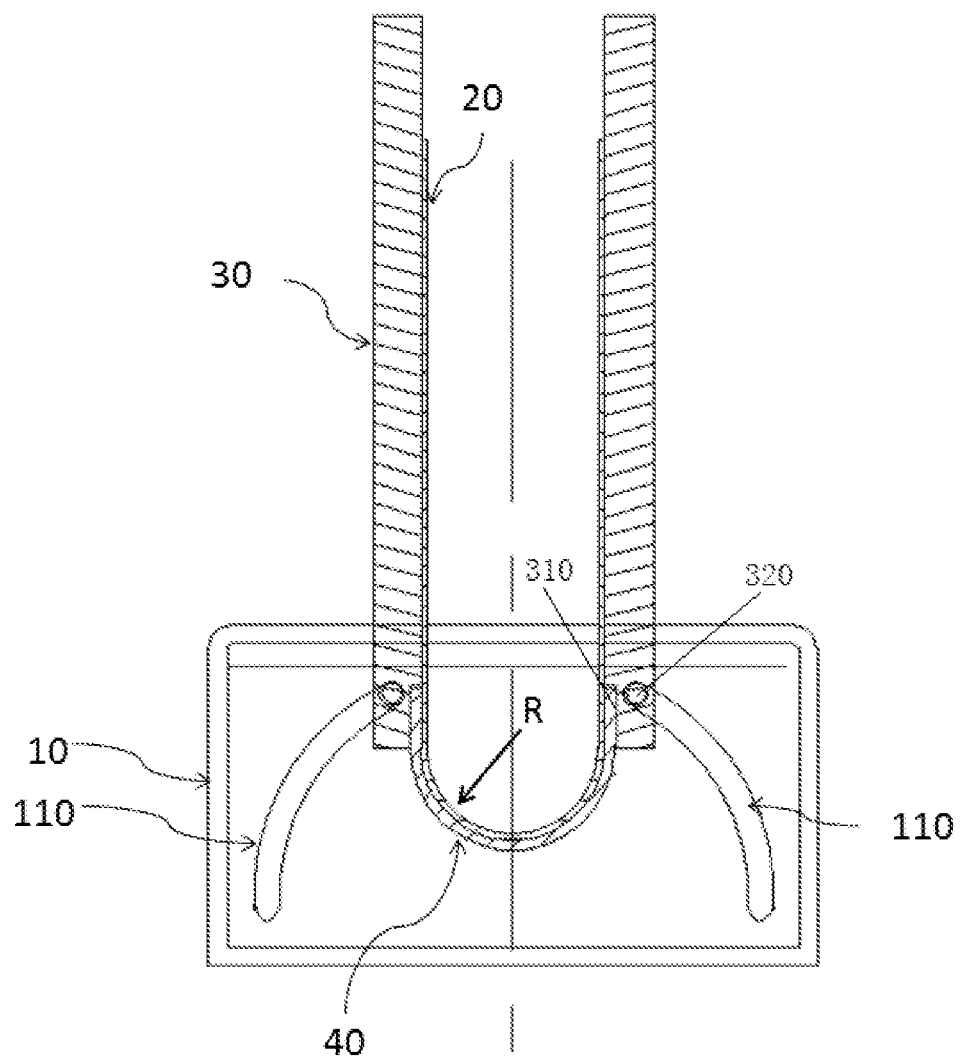
FIG. 4 is a cross-sectional view of the folding mechanism for a flexible display screen in the folded state according to the present disclosure.

The deformable support member 40 is fixed between the two load portions 30. A flexible display screen 20 is secured to the deformable support 40 and at least a portion of each of the load portions 30 provided at both ends of the deformable support 40. Specifically, as shown in FIGS. 3 and 4 in particular, the load portions 30 are provided with grooves 310 at ends thereof facing each other for placing the deformable support member 40, such that when the deformable support member 40 is placed in grooves 310 of the load portions 30, a surface of the deformable support member 40 is flush with surfaces of the load portions 30 towards the flexible display screen 20 so that the flexible display screen 20 can be tiled on the deformable support 40 and at least a portion of each of the load portions 30 provided at both ends of the deformable support 40.

The deformable support 40 is made of a material having a memory function, high toughness and high elasticity, for example, a memory alloy, more specifically, for example, a titanium-nickel alloy, an amorphous metal, and an inorganic material, so that the deformable support member 40 can be bent in any shape and held in a certain shape.

The deformable support member 40 may be a sheet-like structure or a frame-like structure, provided that the deformable support member 40 can be fixed between the load portions 30 and that the surface of the deformable support member 40 is flush with the surfaces of the load portions 30 towards the flexible display screen 20.

The deformable support member 40 may also be a hinge, in particular, a hinge having a memory function, high toughness and high elasticity.

Figure 1:
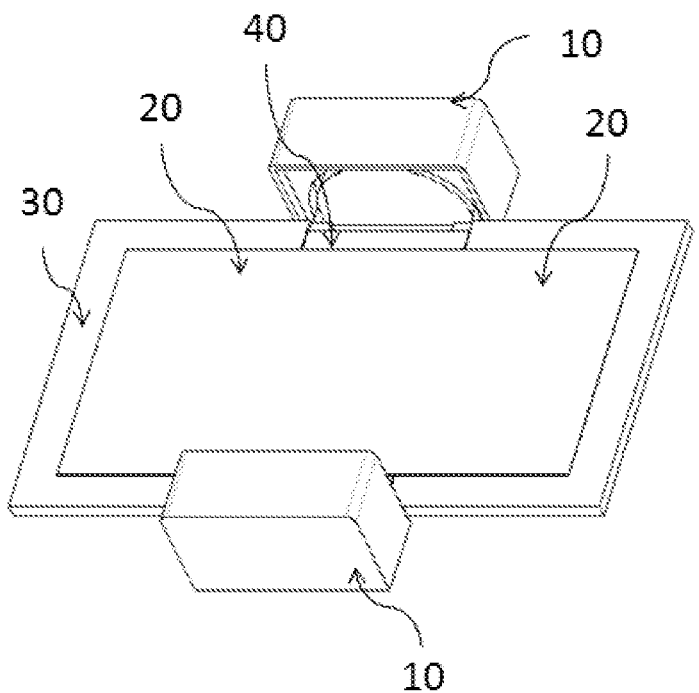
FIG. 1 is a perspective view of a folding mechanism for a flexible display screen in a flattened state according to the present disclosure.
Figure 2:
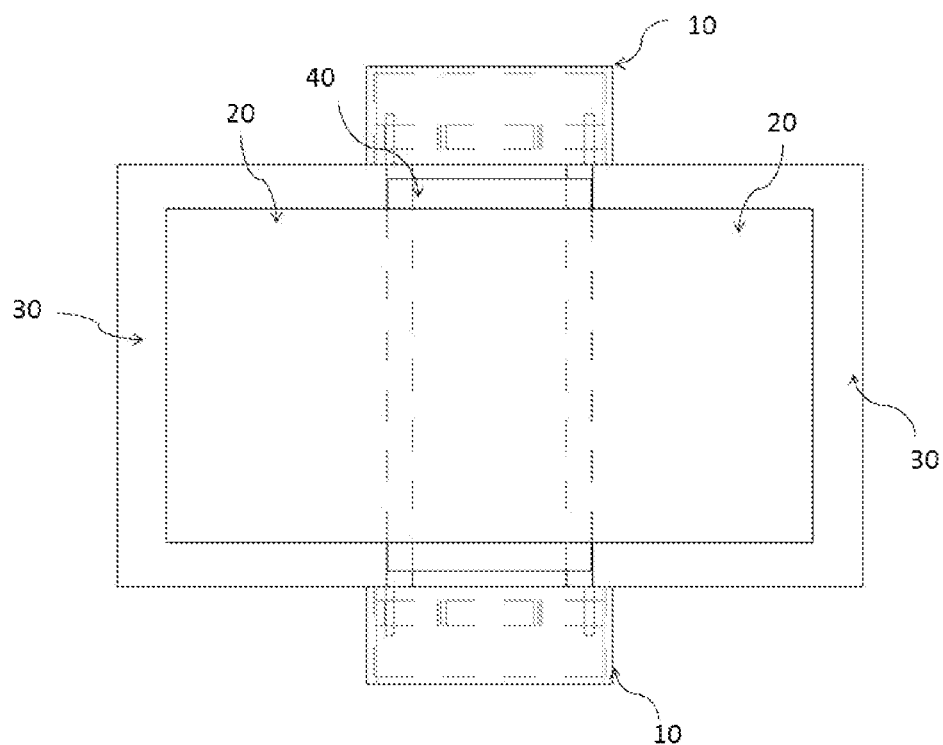
FIG. 2 is a top plan view of the folding mechanism for a flexible display screen in the flattened state according to the present disclosure.

The retaining mechanism 10 is described below, particularly as shown in FIGS. 1, 3, and 4. The number of the retaining mechanism 10 is two. Each of the two retaining mechanisms is arranged on the upper and lower sides of the deformable support member 40, and the two retaining mechanisms are arranged at two opposite ends of the deformable support member 40. The two load portions 30 are arranged at the other two opposite ends of the deformable support member 40.

Each of the retaining mechanisms 10 is provided with two curved slide rails 110 that are symmetrical and have predetermined tracks. In particular, the slide rail 110 has the form of an arc and is bent toward a center of the retaining mechanism 10 and configured to limit moving tracks of the sliders 320. The two sliders 320 in the two slide rails 110 of the same one retaining mechanism 10 simultaneously move along two opposite directions.

Correspondingly, the load portions 30 are provided with sliders 320 on upper and lower sides of the ends thereof facing each other. Each of the sliders 320 is configured to move within a corresponding slide rail 110 of the retaining mechanism 10. It should be noted that the sliders 320 may be aligned with the ends of the deformable support member 40 such that when the deformable support member 40 is bent, it is convenient to calculate trajectory of the slide rail 110 according to a curved radius of the deformable support member 40. As shown in FIG. 3, when the flexible display screen 20 is in a flattened state, the slider 320 is located at the bottom of the slide rail 110. As is shown in FIG. 4, when the flexible display screen 20 is in a maximum folded state, the slider 320 is located at the top of the slide rail 110, where the deformable support member 40 is curved in a circular arc and has a radius R.

A distance between the sliders 320 on the same side of the load portion 30 is defined as L when the sliders 320 are located at the bottom of the slide rails 110, a width of the deformable support member 40 is also L. Then, a formula is listed below (see FIG. 5):

$$L = \pi R = \pi \theta r / 90.$$

Figure 5:
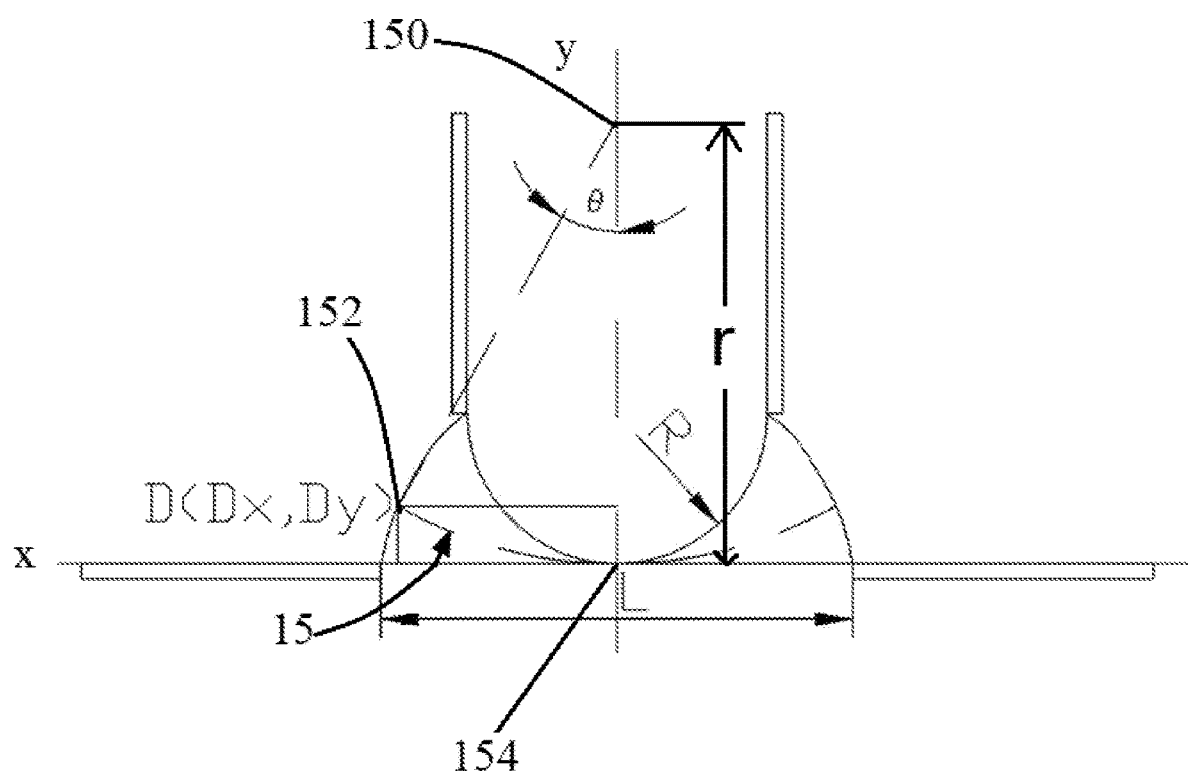
FIG. 5 is a schematic view of the folding mechanism for a flexible display screen in the folded state according to the present disclosure.

Wherein, as shown in FIG. 5, a planar rectangular coordinate system is introduced with the central point 154 of the deformable support member 40 as origin of coordinates, the x axis is parallel to the deformable support member 40 in flattened state, and the y axis is perpendicular to the deformable support member 40 in a flattened state; a circular arc 15 is defined by the central point 154, a point 152 on the slide rail 110, and a circle center point 150 on the y axis; θ is an angle between a straight line passing through the circle center point 150 and the point 152 on the slide rail 110 and the y-axis, and r is a radius of the circular arc 15.

A trajectory point D of any of the sliders 320, which is regarded as the point 152 on the slide rail 110, satisfies the following conditions in the planar rectangular coordinate system:

$$Dx = r^*\sin(\theta), Dy = r - r^*\cos(\theta)$$

Dx is a coordinate value of the trajectory point D along the x axis, Dy is a coordinate value of the trajectory point D along the y axis.

Thus, the trajectory of the slide rail 110 can be obtained.

Preferably, the slider 320 may be a rotating axis, and an elastic member (e.g., a spring or an elastic piece) may be provided on the rotating axis so that the rotating axis may stop sliding in any angle or close when rotating.

In a folding process, the predetermined track of the slide rail 110 is required to ensure that the load portion 30 is always tangent to the deformable support member 40 so that the flexible display screen 20 does not have to withstand a pressure of the load portion 30 during bending or folding, by way of which an internal stress of the flexible display screen 20 is reduced, and wrinkles in the flexible display screen are thus avoided and the service life of the flexible display screen 20 is extended.

The operating principle of the present disclosure is as follows:

When the flexible display screen 20 needs to be folded, it is only necessary to pull the two load portions 30 towards each other. In this case, the slider 320 on the load portion 30 will move along the slide rail 110 of the retaining mechanism 10, and when the slider 320 gets to the top of the slide rail 110, the flexible display screen 20 enters a folded state, which is the maximum degree of bending provided by the retaining mechanism 10 for the flexible display screen 20.

When the flexible display screen 20 needs to be flattened, it is only necessary to pull the two load portions 30 away from each other, and the slider 320 on the load portion 30 will move along the slide rail 110 of the retaining mechanism 10, and when the slider 320 gets to the bottom of the slide rail 110, the flexible display screen 20 enters a flattened state, which is the maximum permissible flat condition provided by the retaining mechanism 10 for the flexible display screen 20, i.e., the flexible display screen 20 can be horizontally disposed.

In summary, the present disclosure provides a folding mechanism for a flexible display screen, having the following beneficial effects. It can realize functions of bending, folding and flatting the flexible display screen. In addition, the retaining mechanism has functions of a guide rail and a retaining member so that the load portion is bent inwardly along the predetermined track to realize bending and folding without wrinkling.

While the present disclosure has been described with reference to preferred embodiments, various modifications may be made thereto without departing from the scope of the disclosure, and equivalents may be used to substitute parts thereof. In particular, the technical features mentioned in the various embodiments may be combined in any manner as long as there is no structural conflict. The present disclosure is not limited to the specific embodiments disclosed herein, but includes all technical solutions falling within the scope of the claims.

The invention claimed is:

1. A folding mechanism for a flexible display screen, wherein the folding mechanism comprises: a deformable support member; two load portions, respectively secured to two opposite ends of the deformable support member, wherein a flexible display screen is secured to the deformable support and at least a portion of each of the load portions located at both ends of the deformable support member, and the load portions are provided with sliders on two sides of ends thereof facing each other, and two retaining mechanisms, respectively secured to the other two opposite ends of the deformable support member, wherein each of the retaining mechanisms is provided with two slide rails having predetermined tracks and configured to limit moving tracks of the sliders, and sliders of the load portions are configured to move within corresponding slide rails and limited by the slide rails; wherein the slide rail is curved and bent toward a center of the retaining mechanism, and the two sliders in the two slide rails of the same one retaining mechanism simultaneously move along two opposite directions.

2. The folding mechanism for a flexible display screen according to claim 1, wherein the deformable support member is made of a memory alloy.

3. The folding mechanism for a flexible display screen according to claim 1, wherein the deformable support member is made of a titanium-nickel alloy, an amorphous metal, or an inorganic material.

4. The folding mechanism for a flexible display screen according to claim 1, wherein two slide rails on each of the retaining mechanisms are symmetrical.

5. The folding mechanism for a flexible display screen according to claim 1, wherein a planar rectangular coordinate system is introduced with the central point of the deformable support member as origin of coordinates, x axis is parallel to the deformable support member in flattened state, and y axis is perpendicular to the deformable support member in flattened state; a first circular arc is defined by the central point, a point on the slide rail, and a circle center point on the y axis; a trajectory point D of the slide rail satisfies the following conditions in the planar rectangular coordinate system:

$$Dx = r*\sin(\theta), Dy = r - r*\cos(\theta)$$

wherein, Dx is a coordinate value of the trajectory point D along the x axis, Dy is a coordinate value of the trajectory point D along the y axis, θ is an angle between a straight line passing through the circle center point and the point on the slide rail and the y-axis, and r is a radius of the first circular arc;

when the flexible display screen is in a flattened state, the sliders are located at the bottom of the slide rails; when the flexible display screen is in a maximum curved state, the sliders are located at the top of the slide rails, so that the deformable support member is curved in a second circular arc and has a radius R, where L=πR, L represents a distance between the sliders on the same side of the load portion when the sliders are located at the bottom of the slide rails, L also represents a width of the deformable support member.

6. The folding mechanism for a flexible display screen according to claim 1, wherein the load portions are provided with grooves at the two ends thereof facing each other for placing the deformable support member, so that when the deformable support member is placed in the grooves of the load portions, a surface of the deformable support member is flush with surfaces of the load portions towards the flexible display screen.

7. The folding mechanism for a flexible display screen according to claim 1, wherein, during a folding process, the load portion is always tangent to the deformable support member due to the predetermined track of the slide rail.

8. The folding mechanism for a flexible display screen according to claim 2, wherein, during a folding process, the load portion is always tangent to the deformable support member due to the predetermined track of the slide rail.

9. The folding mechanism for a flexible display screen according to claim 3, wherein, during a folding process, the load portion is always tangent to the deformable support member due to the predetermined track of the slide rail.

10. The folding mechanism for a flexible display screen according to claim 1, wherein, during a folding process, the load portion is always tangent to the deformable support member due to the predetermined track of the slide rail.

11. The folding mechanism for a flexible display screen according to claim 4, wherein, during a folding process, the load portion is always tangent to the deformable support member due to the predetermined track of the slide rail.

12. The folding mechanism for a flexible display screen according to claim 5, wherein, during a folding process, the load portion is always tangent to the deformable support member due to the predetermined track of the slide rail.

13. The folding mechanism for a flexible display screen according to claim 6, wherein, during a folding process, the load portion is always tangent to the deformable support member due to the predetermined track of the slide rail.

14. The folding mechanism for a flexible display screen according to claim 7, wherein the sliders are aligned with the ends of the deformable support member.

15. The folding mechanism for a flexible display screen according to claim 8, wherein the sliders are aligned with the ends of the deformable support member.

16. The folding mechanism for a flexible display screen according to claim 9, wherein the sliders are aligned with the ends of the deformable support member.

17. The folding mechanism for a flexible display screen according to claim 10, wherein the sliders are aligned with the ends of the deformable support member.

18. The folding mechanism for a flexible display screen according to claim 11, wherein the sliders are aligned with the ends of the deformable support member.

19. The folding mechanism for a flexible display screen according to claim 7, wherein the deformable support member is a sheet-like structure or a frame-like structure.

* * * * *